(12) United States Patent
Vincent et al.

(10) Patent No.: US 7,544,418 B2
(45) Date of Patent: Jun. 9, 2009

(54) POLYMER-ENCAPSULATED PIGMENTS AND ASSOCIATED METHODS

(75) Inventors: Kent D. Vincent, Palo Alto, CA (US); Sivapackia Ganapathiappan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 285 days.

(21) Appl. No.: 11/496,892

(22) Filed: Jul. 31, 2006

(65) Prior Publication Data

US 2008/0026221 A1 Jan. 31, 2008

(51) Int. Cl.
*B32B 5/16* (2006.01)
*C09B 67/08* (2006.01)
*C09D 11/00* (2006.01)

(52) U.S. Cl. .................. 428/407; 428/32.5; 428/32.37; 428/212; 106/499; 106/500

(58) Field of Classification Search ............... 428/32.5, 428/32.37, 212, 403, 407; 106/499, 500
See application file for complete search history.

(56) References Cited

U.S. PATENT DOCUMENTS

| | | | |
|---|---|---|---|
| 3,615,469 A | 10/1971 | Ramp | |
| 4,078,493 A | 3/1978 | Miyamoto | |
| 4,665,107 A | 5/1987 | Micale | |
| 5,554,739 A | 9/1996 | Belmont | |
| 5,708,095 A | 1/1998 | Greezo Page et al. | |
| 5,786,420 A | 7/1998 | Grandhee | |
| 5,814,685 A | 9/1998 | Satake et al. | |
| 5,922,118 A | 7/1999 | Johnson et al. | |
| 5,954,866 A | 9/1999 | Ohta et al. | |
| 5,977,210 A | 11/1999 | Patel et al. | |
| 5,990,202 A | 11/1999 | Nguyen et al. | |
| 6,057,384 A | 5/2000 | Nguyen et al. | |
| 6,214,467 B1 * | 4/2001 | Edwards et al. ............. 428/407 |
| 6,248,805 B1 | 6/2001 | Nguyen et al. | |
| 6,277,437 B1 | 8/2001 | Helmer et al. | |
| 6,306,994 B1 | 10/2001 | Donald et al. | |
| 6,395,805 B1 * | 5/2002 | Takao ......................... 523/205 |
| 6,417,249 B1 | 7/2002 | Nguyen et al. | |
| 6,767,090 B2 | 7/2004 | Yatake et al. | |
| 6,841,591 B2 * | 1/2005 | Vincent et al. .............. 523/160 |
| 6,858,301 B2 * | 2/2005 | Ganapathiappan .......... 428/407 |
| 6,924,035 B2 * | 8/2005 | Auweter et al. ............. 428/407 |
| 2002/0025994 A1 | 2/2002 | Ishizuka et al. | |
| 2003/0029355 A1 | 2/2003 | Miyabayashi | |
| 2003/0044626 A1 | 3/2003 | Kim et al. | |
| 2003/0050362 A1 | 3/2003 | Sakai et al. | |
| 2003/0195274 A1 | 10/2003 | Nakamura et al. | |
| 2003/0225185 A1 | 12/2003 | Akers, Jr. et al. | |
| 2004/0063808 A1 | 4/2004 | Ma et al. | |
| 2004/0066440 A1 | 4/2004 | Ungefug et al. | |
| 2004/0112525 A1 | 6/2004 | Pereira et al. | |
| 2004/0116596 A1 | 6/2004 | Vincent et al. | |
| 2004/0127639 A1 | 7/2004 | Wang et al. | |
| 2004/0131855 A1 | 7/2004 | Ganapathiappan | |
| 2004/0157956 A1 | 8/2004 | Vincent et al. | |
| 2004/0157957 A1 | 8/2004 | Ganapathiappan et al. | |
| 2005/0137319 A1 | 6/2005 | Vincent et al. | |

FOREIGN PATENT DOCUMENTS

| | | |
|---|---|---|
| EP | 1 088 865 | 4/2001 |
| EP | 1 245 652 | 10/2002 |
| EP | 1 270 681 | 1/2003 |
| EP | 1 300 422 | 4/2003 |

OTHER PUBLICATIONS

Bicerano, Jozef, "Prediction of Polymer Properties," 1996, pp. 244-249.

* cited by examiner

*Primary Examiner*—H. (Holly) T Le

(57) ABSTRACT

The present invention is drawn to polymer-encapsulated pigments and methods of making the same. The method includes providing an emulsion including water and a discontinuous coating phase having a copolymer dissolved in a monomer mix; providing a pigment dispersion including water, surfactant, and pigments dispersed therein; mixing the emulsion with the pigment dispersion under high shear conditions such that the coating phase is deposited on the pigments, thereby forming polymer and monomer coated pigments; and polymerizing the monomers at the surface of the polymer and monomer coated pigments to form polymer-encapsulated pigments dispersed in a fluid medium.

15 Claims, No Drawings

POLYMER-ENCAPSULATED PIGMENTS AND ASSOCIATED METHODS

BACKGROUND OF THE INVENTION

The majority of inks and toners used in the printing industry employ water insoluble polymers for print adhesion and durability. Water-based inks, such as used in ink-jet printing, can incorporate water insoluble polymer as dispersed particulates. The particulates are typically designed with a glass transition temperature (Tg) near room temperature to allow formation of a print-film on the printed substrate under normal ambient conditions. Alternatively, these water insoluble polymers can be coated on the surface of pigments in the form of polymer-encapsulated pigments.

Polymer encapsulated pigments of various kinds are known in the colorant art. The Sunsperse and Flexiverse polymer coated pigments from Sun Chemical Corp. are representative. While encapsulation methods and chemistries are known and well documented, the prior art has, here-to-fore, not taught polymer chemistries compatible or effective with thermal ink-jet. The prior art capsules are formed typically with dissolved polymers that are adsorbed onto the pigment surface. Inasmuch as the dissolved polymers are usually not crosslinked, the polymer surfaces of such known encapsulated pigments typically agglomerate under the high thermal shear and solvent conditions of the pen firing chamber, causing nozzle and ink channel blockages, or have excessive glass transition temperatures that prevent room temperature print film formation. Thus, typically, the incorporation of such polymer encapsulated pigments within thermal ink-jet inks either results in pen reliability or poor print durability colorant performance.

Conversely, the introduction of separate pigment and polymer particle components has several shortcomings as well. The combined surface areas of the latex and pigment particles adversely increase the viscosity of the ink-jet such that drop ejection rates and drop weight are limited to lower than otherwise norms. Such viscosities also negatively impact the collapse of nucleated vapor bubbles on thermal drop ejection, entrapping gas within firing chamber upon subsequent firings. Entrapped gas significantly retards ink-jettability. Likewise, differences between latex and pigment surface charges and charge levels can induce dispersion instabilities and performance changes within the ink over time. In addition, the pigment and latex often dissociate in the fibers of plain paper reducing both the otherwise durability and optical density of the print. Still further, many entrapped pigment particles are exposed above the surface of the latex film lowering print gloss and inducing gloss non-uniformities between different colored pigments within a print.

Thus, there is a continued need for development of pigment- and polymeric material-containing ink-jettable inks that are reliable when using thermal ink-jet architecture, and which have acceptable image quality and film forming properties.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which polymer-encapsulated pigments are dispersed to form ink-jet inks in accordance with embodiments of the present invention. Many liquid vehicles and vehicle components are known in the art. Typical ink vehicles can include a mixture of a variety of different agents, such as surfactants, co-solvents, buffers, biocides, sequestering agents, viscosity modifiers, and/or water.

"Pigment" can include color-imparting particulates and other substance that may be suspended or solvated in a liquid vehicle with the polymer-encapsulated pigments in accordance with embodiments of the present invention. Pigments that can be used include self-dispersed pigments, dispersant-dispersed pigments, raw pigments, etc. Self-dispersed pigments included those that have been chemically surface modified with a charge or a polymeric grouping. This chemical modification aids the pigment in becoming and/or substantially remaining dispersed in a liquid vehicle. The pigment can also be a dispersant-dispersed pigment that typically utilizes a dispersant (which can be a polymer, an oligomer or a surfactant) in the liquid vehicle and/or in the pigment that utilizes a physical coating to aid the pigment in becoming and/or substantially remaining dispersed in a liquid vehicle. With respect to the other particulates that can be used, examples include semi-metal and metal particulates, semi-metal oxide and metal oxide particulates, dispersible silicates and glass particulates, ferromagnetic and other magnetic particulates, whether or not such particulates impart color. Applicable pigments are typically 10 nm to 10 μm in size depending on the dispersing medium, preferably less than 500 nm in size for dispersion in water. The sizing of each pigment can be conventionally produced through a shearing mechanism, depending on material, and includes, for example, milling, microfluidization, and sonification. In the present invention, the pigment particles are typically dispersed in a medium such as water. This is typically accomplished by shearing the pigment in the presence of the medium and a surfactant, dispersing polymer or other dispersant. The amount and type of dispersant required normally depends on the shearing process, medium and pigment material. It is quite common to require a significant portion of dispersant to overcome re-aggregation forces caused, for example, by triboelectric charges developed through the shearing process, though this is not required.

"Bridging component" includes materials for inclusion in a bridging layer that can passivate pigment surfaces for application of a polymer shell. In one embodiment, the bridging component can be solubility sensitive to temperature, pH, dilution or concentration, or some other environmental change in the medium that contains the bridging component. For example, a bridging component has a first solubility in a solvent(s) at a first temperature or pH, and a second solubility in that solvent(s) when the temperature or pH is changed, usually relatively minimally, e.g., changing a pH from 5.5 or less to 6.0 or greater or vice versa, or changing a temperature from room temperature to above 32° C. or vice versa. Typically, the bridging component is a polymer. The bridging component is used in accordance with embodiments of the present invention to form a bridging layer on a pigment particulate.

"Bridging layer" is an optional layer that can be positioned between a pigment core and a polymer encapsulation layer in accordance with embodiments of the present invention. The bridging layer includes a bridging component, which is typically a soluble material that is desolublized and deposited on the pigment surface by a change in the environmental conditions, e.g., temperature, pH, etc., of the fluid of the pigment dispersion in which it is carried. In another embodiment, the surface of the pigment can be for reacting out surface groups and placing a fast reacting monomer layer on the surface. In this alternative embodiment, the polymer capsule layer, for example, may include slower reacting monomers that are inhibited by the retarding pigment surface groups. In other embodiments, a pigment particle can be coated through solvent extraction. In this case, an otherwise solid polymer can be dissolved with a solvent into an emulsion and coated on the pigment surface under high shear. Once the polymer is adsorbed on the pigment surface in a liquid state (liquid by virtue of the solvent that is still present in the polymer), the solvent is extracted, e.g., heated, diluted with additional water, etc., so that the polymer resolidifies. Alternatively, an otherwise solid polymer may be melted to a liquid and mixed with hot water to form an emulsion. The polymer is then adsorbed on the pigment surface, again usually with high shear, e.g. microfluidizer, sonicator, etc. Once coated on the pigment surface, the molten polymer is cooled to re-establish its solid form by cooling the mixture. Whatever technology is used to form the optional bridging layer, it is noted that if a bridging layer is used, the polymer shell prepared in accordance with embodiments of the present invention can be applied directly to the bridging layer.

"Polymer encapsulation layer" is a layer of polymer or latex material that is deposited on or attached to the surface of a pigment particle, or alternatively, is attached to an intermediate bridging layer which is deposited on the surface of the pigment. This layer can be attached or deposited on the pigment particle or on a bridging layer deposited on the pigment particle. If an environmentally sensitive bridging layer is used, once the polymer encapsulation layer is formed, the change of the environmental conditions that brought about the formation of the bridging layer is typically of little consequence, and the polymer encapsulation layer acts to protect the bridging layer from becoming substantially resolubilized. It is noted that in accordance with embodiments of the present invention, the polymer encapsulation layer is applied as a mixture of monomers and a polymer dissolved therein, and then once on the surface of the pigment (or bridging layer), the monomers are polymerized and the pre-existing polymer and newly polymerized monomers form the polymer encapsulation layer.

When referring to a "polymer" that is admixed or dissolved in a monomer mix for coating a pigment particle, this term includes any polymeric or oligomeric material that raises the viscosity of a monomer mix sufficient to increase the resultant capsule thickness.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

With these definitions in mind, a method of preparing a polymer-encapsulated pigment dispersion can comprise the step of providing an emulsion including water and a discontinuous coating phase, wherein the discontinuous coating phase includes a copolymer dissolved in a monomer mix; and the step of providing a pigment dispersion including water, surfactant, and pigments dispersed therein. Additional steps include mixing the emulsion with the pigment dispersion under high shear conditions such that the coating phase is deposited on the pigments, thereby forming polymer and monomer coated pigments; and polymerizing the monomers at the surface of the polymer and monomer coated pigments to form polymer-encapsulated pigments dispersed in a fluid medium.

In another embodiment, a polymer-encapsulated pigment can comprise a pigment core and a polymer shell. The polymer shell can include a first portion of polymer generated at the surface of the pigment core and a second portion of polymer generated prior to incorporation into the polymer shell. The resultant polymer shell can be a copolymer including at least one acidic monomer and at least one non-acidic monomer, wherein the at least one acidic monomer is copolymerized substantially throughout the polymer shell but is more concentrated at an outer surface of the polymer shell than within the polymer shell. It is noted that this concentration difference between the outer surface and within the polymer shell with respect to the acidic groups can be accomplished without using core-shell polymers (with respect to the polymer shell per se). In other words, the polymer shell can be a continuous polymer where certain monomers used to form the copolymer are present substantially throughout the copolymerization process (and thus, are typically present substantially throughout the entire copolymer—or until a monomer is used up). Thus, such copolymers can included at least one acidic monomer and at least one non-acidic monomer, for example, where both monomers are copolymerized substantially throughout the polymerized latex particulate. However, the acidic monomer will be present at a low frequency at a first end of the polymer chain, and at a higher frequency at a second end of the polymer chain (up to and including 100% acidic monomer at the surface of the particulate formed by the polymerization process).

In one embodiment, the polymer-encapsulated pigment can be formulated and dispersed in an ink-jet ink composition, such as a piezoelectric ink-jet ink or a thermal ink-jet ink. These polymer-encapsulated pigments are jetted well from both types of ink-jet architecture, but are particularly adapted for the more stringent requirements of thermal ink-jet applications.

In accordance with these embodiments, various details are provided below which are applicable to each of the method, polymer-encapsulated pigment(s), and associated ink composition. For example, in preparing the discontinuous coating phase, the copolymer dissolved in the monomer mix can be a copolymer that is prepared using at least one of the monomers of the monomer mix, all of the monomers of the monomer mix, and/or only the monomers of the monomer mix. The high shear conditions can be generated by any known method, including sonification and/or microfluidization. Generating the polymer on the surface of the pigment can be carried out by adding an initiator which contacts the polymer and monomer coated pigments, or by adding a heat sensitive initiator to the to the discontinuous phase which can be activated by heating the coated particles after formation. In some embodiments, a bridging layer can be juxtaposed between the pigment core and the polymeric shell. Further, the polymer-encapsulated pigment(s) can be formulated to have bulk density from 0.90 g/cm$^3$ to 1.10 g/cm$^3$ and a surface dielectric constant from 2.0 to 3.0 at room temperature, or alternatively, to have bulk density from 1.0 g/cm$^3$ to 1.05 g/cm$^3$ and a surface dielectric constant from 2.0 to 2.8 at room temperature. Additionally, the polymer shell of the polymer-encapsulated pigments can include a crosslinking agent present at from 0.5 wt % to 5 wt %, and/or can be formulated to have a glass transition temperature from 0° C. to 50° C. Various sizes of polymer-encapsulated pigments can also be prepared, including those ranging from 50 nm to 400 nm in diameter. Still further, the polymer shell of the polymer-encapsulated pigments can have an average thickness from 30 nm to 100 nm. In one embodiment, the polymer shell of the polymer-encapsulated pigment can include at least 10% more surface acidic monomer by weight than is present within the polymer. These specific details are provided above by way of a summary, and further detail regarding the same is provided in more detail below. U.S. patent application Ser. No. 10/360,472, filed on Feb. 6, 2003; Ser. No. 10/360,473, filed on Feb. 6, 2003; and Ser. No. 11/486,488, filed on Jul. 14, 2006 disclose some of these relationships in greater detail, and are incorporated herein by reference.

This being stated, the present disclosure relates to a novel and successfully proven chemistry and method for encapsulating individual pigment particles with a thermal ink-jet compatible polymer of sufficient capsule thickness to provide highly durable print films. In other words, a novel chemistry that allows thick polymer capsule formation around individual pigment particles, as appropriate for durable thermal ink-jet print film formation, using a conventional high shear miniemulsion synthetic process is described herein. The invention can utilize miniemulsion synthesis. These teachings are fully extensible to a broad range of printing and coating applications, including toner particles for liquid and dry electrophotography. In one embodiment, the present invention is directed to polymer-encapsulated pigments that can have a greater concentration of acid at their surfaces than at the interface between the pigment particle and the polymer coating.

The formation of pigment suspensions in accordance with the above embodiments provides several advantages. For example, polymer-encapsulation of pigments tends to reduce the number of total particles in solution (as opposed to having separate latex particulates co-dispersed with the pigments) and their combined surface areas such that the pigment suspension, e.g., ink, viscosity can be reduced. Such polymer-encapsulation also provides a particle dispersion where the particle surfaces are more uniformly charged, and are therefore more stable. Encapsulation also prevents pigment-latex separation when applied to a substrate, e.g., ink printed on a media substrate, such that durability and optical density are more optimized. Polymer-encapsulated pigments also facilitate the result that each pigment particle becomes trapped below the surface of latex formed films (after printing) such that gloss and color-to-color gloss uniformity is enhanced. Additionally, when preparing an ink set, by applying an optional bridging layer to the surface of each of the different pigments in the ink set, common polymer encapsulation layers can be applied to the surface of each of the different types of pigments without difficulty, which provides significant advantages in print quality, thermal ink-jet reliability, etc. It is common, for example, that the relative surface tension and polarity of the pigment surface and absorbing monomer can influence the integrity of encapsulation. A common bridging layer for each different colored pigment can be selected to optimize or improve the particle surface tension and polarity for a given capsule polymer. Further, uniquely in accordance with embodiments of the present invention, relatively thick coatings of monomers and polymer admixtures can be effectively applied, which can be polymerized to form the polymeric shell.

In further detail, in-situ monomer polymerization around individual polymer particles is desired for crosslinking but is made difficult by the fact that many pigments contain free radical quenching surface groups such as amines and phenols. Such quenching disrupts polymer formation and adsorption on the pigment surface and results in residual unreacted monomer in the finished product. In one embodiment, the surface of the pigment can be modified with a bridging layer, e.g., passivated, prior to coating the monomer/polymer coating on its surface, and in other embodiments, such a bridging layer may not be necessary or desirable. If the pigment surface is to be bridged with an intermediate layer between the pigment core and the polymer encapsulation layer, then the techniques described in U.S. patent application Ser. No. 11/414,099, filed on Apr. 28, 2006, which is incorporated herein by reference, can be used.

It is known that certain monomers can be coated on the surface of particles under high shear conditions, such as those high shear conditions provided by sonification or microfluidization, as described in the publication "Preparation of Polymeric Nanocapsules by Miniemulsion Polymerization" by Franca Tiarks, Katharina Landfester and Markus Antonietti, published by Langmuir 2001, 17, pages 908-918, which is incorporated herein by reference. With this background in mind, it has been recognized that by dissolving polymer in a monomer mix, high shear conditions can likewise be used to apply these more viscous materials to the surface of a pigment particle, and thus, apply thicker coatings than by conventional polymer adsorption. Under these conditions, a discontinuous phase of an emulsion or microemulsion having both monomer and dissolved polymer contained therein can be finely dispersed to nano-sized particles. At this size and under shear conditions, the nano-sized particles can become adhered to the surface of a pigment upon collision therewith, thereby stabilizing the finely dispersed discontinuous phase on the surface of the pigments. In other words, a pigment and an aqueous emulsion of the monomer and dissolved polymer can be sheared with sufficient intensity that the monomer/polymer disperses into nanodroplets only capable of stable condensation on the pigment surface. A layer of monomer/polymer builds on the pigment surface until the shear gradient surrounding each pigment is sufficient to strip off additional adsorbing monomer/polymer mixture.

By adding polymer to a monomer mix, as described above, the polymer to the monomer mix increases the otherwise low viscosity of the coating composition, and, hence, cohesive energy of the monomer used to encapsulate pigment through the high shear miniemulsion process. Without being bound by any particular theory, the capsule thickness formed under shear may be proportional to the cohesive energy of the monomer mix in resisting its shear stripping in the high shear field surrounding the dispersed pigment particle. In other words, as additional monomers and polymer become adsorbed or absorbed on the pigment particle, the monomer thickness increases until the cohesive energy of the monomer is insufficient to resist shear stripping by the shear field produced at a given radius from the particle surface. Monomers, in general, have very low viscosity, typically around 1 cps, and thereby low cohesive energy. It has been recognized that the addition of polymer to the monomer mix can significantly increase the viscosity and cohesive energy of the monomer mix and, thereby, the thickness of monomer absorbed onto the pigment particle. From transmission electron microscopy (TEM) studies of encapsulated particles, a pure monomer mix, for example, generally produces a capsule thickness on the order of 15 nm, while 25% by weight addition of polymer increases the capsule thickness to 60 nm or beyond under standard microfluidization shear conditions. A 15 nm capsule layer is generally not thick or compliant enough to coalesce with other encapsulated particles to form films, independent of polymer composition. Conversely, a 60 nm thick capsules, forms films well, with an appropriately designed polymer, upon printing or coating on a substrate.

As set forth above, the polymer-encapsulated pigments of the present invention comprises a pigment particle encapsulated with a polymer created through a mixture of monomer and polymer. The pigment particle is optionally first encapsulated with a bridging layer, such as a passivation layer. If a bridging layer is used, the dispersed pigment particle can be, for example, passivated with a capsule forming layer that isolates radical-quenching pigment surface groups from monomers and polymers subsequently adsorbed and polymerized on the pigment surface.

The encapsulation layer of the present invention (distinguished from the optional bridging layer) is formed from a solution of monomer and polymer. A typical viscosity for a traditional monomer mix is typically less than about 10 cps. By adding an existing polymer to the monomer mix, the monomer/polymer mix can have mix viscosities on the order of 10 cps to 50 cps, or even higher. In some embodiments, a viscosity of about 25 cps can be optimal. It is noted that the viscosity can be modulated by adjusting monomer/polymer ratios, polymer choice, etc. Selecting an optimal viscosity can depend on the degree of shear and visco-elastic properties of the monomer mix, as well as the desired outcome, e.g., thickness. In one embodiment, the polymer is the polymerization product of one or more of the monomers in the monomer mix. In another embodiment, the polymer is the reaction product of all the monomers in the monomer mix. As polymers are typically soluble in their own monomer mix, in one embodiment, the monomer mix can be the same as the "mers" of the polymer dissolved therein, though this is not required. The optimal molecular weight and addition percent of the added polymer will depend, of course, on the particular composition, encapsulation conditions, and desired capsule thickness. Excessive molecular weight or addition quantity of monomers can result in the undesired aggregation of the pigment capsules. Excessively low molecular weight or addition quantity can result in insufficient cohesive energy increase and consequent low capsule thickness. Though excessively high or low molecular weight and addition quantities of materials are within the scope of the present invention, often, an optimum middle ground is desirable to achieve near to complete monomer polymerization on the pigment surface with desired thickness and without reagglomerated polymer in the liquid vehicle.

To optimize the polymer-encapsulated pigments for use in thermal ink-jet architecture (which is not required), certain polymer properties can be desirable to achieve. For example, thermal ink-jet optimization may be achieved within a narrow range of crosslinking, nominally 1-3% by weight of the monomer mix, a polymer dielectric constant below 2.8, and the optional use of a blocked acid monomer. A blocked acid monomer is preferably hydrophobic and not extensively pulled from the monomer to water phase by the action of surfactants used to dispersion stabilize the pigment. Once the capsule is polymerized, the acid is unblocked, typically by heat and/or pH change, to generate acid groups at the capsule surface. Such blocked acid monomers are described in more detail in U.S. patent application Ser. No. 10/741,536, filed on Dec. 19, 2003, which is incorporated herein by reference.

Hydrophobic acids such as vinylbenzoic acid may alternately be used in preference over more hydrophilic acid monomers that are more easily extracted to the water phase. Capsule dispersion stabilization may also be accomplished through the use of reactive surfactants, either in addition to or at the exclusion of acid monomers. In certain instances, conventional surfactants may be used exclusively for capsule dispersion stability. Such use, however, generally works better when the polymer surface dielectric constant is below 2.6 to encourage sufficient adhesion of the surfactant hydrocarbon to resist thermal shear stripping in the pen firing chamber.

In further detail regarding the bridging layer, e.g., passivation layer, this layer can be a polymer that can also act as a seed layer for subsequent monomer/polymer adsorption. Passivation can also be accomplished with a non-polymer, for example a silicate layer. A polymer passivation layer may be produced by absorption of a polymer or in-situ polymerization of an adsorbed monomer or monomer mix. Either method may be undertaken through the use of a microfluidizer or sonicator to shear-destabilize the polymer or monomer in the liquid emulsion, providing conditions for absorption on individual pigment particle surfaces. Direct polymer attachment normally utilizes a solvent to form a polymer solution in the medium. Alternative means include a hot melt process wherein a wax or other polyolefin polymer, for example, is absorbed on the particle surface in a melt or semi-melt state and solidified with cooling. Such a polyolefin bridging layer may be used, for example, to reduce the surface energy, polarity and/or solubility parameter of the particle surface. Monomer adsorption can be accomplished through an emulsion of the monomer. In the latter case, a monomer soluble initiator is typically introduced into the monomer mix in large quantity to compensate for the presence of radical-quenching groups on the pigment surface. It is noted that the produced passivation polymer may lack full physical properties due to radical quenching. This factor is not critical because the passivation layer will ultimately be over-encapsulated with a well formed and performing polymer. The passivation polymer is preferably chosen to withstand the subsequent encapsulation step without promotion of pigment reaggregation. Generally, the polymer chosen has a high glass transition temperature, determined by shear conditions, and poor solubility in the encapsulating medium. Both conditions may be satisfied through crosslinking in some embodiments. For water-based encapsulation, polystyrene has been discovered to be a good choice for pigment passivation, particularly for ring containing pigments such as carbon black. Further details regarding the bridging layer are set forth below.

In further detail, without the bridging layer applied to a pigment surface as described above, in-situ monomer polymerization around individual pigments can be made more difficult because most pigments contain free radical quenching surface groups such as amines and phenols. Such quenching disrupts polymer formation and adsorption on the pigment surface, and thus, can result in residual unreacted monomer in the finished product. In the present invention, pigment particles can be "passivated" by adsorption of a bridging layer on the surface of the pigment particle or pigment core. The bridging layer can be applied using a bridging component, e.g., bridging polymer or other bridging material, which has two water solubility states, e.g., more water soluble vs. less water soluble. Such different states may be induced thermally, by pH change, by concentration change or dilution, or other mechanism. In its water soluble state, the bridging component can be part of an aqueous solution which includes at least some of the bridging component in a dissolved form, and further includes homogenously dispersed pigment particles. The bridging component can be converted to a bridging layer, e.g., passivation layer, by converting the bridging component (which can be a dissolved polymer) into its water insoluble state. Thus, the polymer wants to come out of solution and becomes adsorbed onto the hydrophobic surface of the pigment. Once formed, the adsorbed polymer or bridging layer provides a surface that is suitable for latex or other polymers to be attached thereto. As mentioned, in one embodiment, the bridging layer passivates the pigment surface and creates a seed layer for monomer encapsulation, such as by an emulsion polymerization monomer feed process. This bridging layer can also create a suitable surface for subsequent polymer attachment.

Regarding the formation of the bridging layer per se, in one embodiment, the bridging component polymer can be a polyalkylacrylamide or combination of polyalkylacrylamides. In particular, polyisopropylacrylamide is water soluble at room temperature and water insoluble at temperatures above 32° C. In this instance, pigment passivation is induced by raising the temperature of the dissolved polymer in the pigment dispersion solution to above 32° C. This and other polyalkylacrylamides provide an excellent seed layer for emulsion polymerization of an encapsulating monomer and resultant polymer. Polyisopropylmethacrylamide is another example of a thermally sensitive bridging component that can be used. As a particular benefit, the formation of the bridging layer and subsequent polymer encapsulation layers can be carried out in a single semi-batch process. Additionally, it is noted that because the bridging layer is at least partially or even fully trapped by the hydrophobic latex polymer capsule, there is little consequence associated with its return to a water soluble state when the encapsulated pigment particles are cooled back to room temperature. Other advantages of the bridging layer is that it uniquely enables up to full latex polymer encapsulation of individual pigment particles of sufficient capsule thickness and capsule uniformity to provide both excellent thermal ink-jet printability and durable print film formation. It should be noted, however, that though these polymer-encapsulated pigments are particularly useful in thermal ink-jet architecture, the present invention is generally applicable to a wide variety of pigments and applications, including but not limited to paints, coatings, and other inks (including piezo ink-jet and other types of general printing inks).

In further, detail, the bridging component can be any material, e.g., polymer, having an opposed bi-stable water solubility state. Such polymers should be selected for process compatibility with emulsion polymerization process. While several mechanisms for opposed bi-stable water solubility states are available, including thermal, pH, and component concentration changes, thermal induced solubility state change is often less complicated to implement, though both are functional and can be used for the same purpose. This is in part because one skilled in the art will recognize that conventional emulsion polymerization processes involve temperature elevation to invoke polymerization. The reaction bath of the emulsion polymerization process is naturally raised from room temperature, and therefore provides the necessary conditions for thermally induced solubility state change without compromise.

Though a few thermally sensitive polymers have been listed as being useful as bridging components in accordance with embodiments of the present invention, certain pH sensitive bridging components that can be used include poly((2-methacryloyloxy)ethyl phosphorylcholine-block-2-(diisopropylamino)ethyl methacrylate); poly((2-methacrylyoyloxy)ethyl phosphorylcholine-co-2-(diisopropylamino)ethyl acrylate); poly((2-acrylyoyloxy) ethyl phosphorylcholine-co-2-(diisopropylamino)ethyl acrylate); poly((2-acrylyoyloxy)ethyl phosphorylcholine-co-2-(diisopropylamino)ethyl methacrylate); and combinations thereof. These polymers are soluble in water at pH levels less than 5.5 and transform to particles around pH 6.

Other examples of other sensitive polymers that can be used include poly(vinylimidazole-co-methacrylic acid); poly (vinylimidazole-co-acrylic acid); poly(methoxypolyethyleneglycol methacrylate of mol. wt. from 200 to 5000-co-methacrylic acid; poly(methoxypolyethyleneglycol of mol. wt. from 200 to 5000 methacrylate-co-acrylic acid); poly((2-diisopropylamino)ethyl methacrylate-co-methacrylic acid); poly((2-diisopropylamino)ethyl methacrylate-co-acrylic acid); poly(vinylpyrrolidone-co-acrylic acid); and poly(vinylpyrrolidone-co-methacrylic acid); and combinations thereof.

It should be noted that, whether the bridging component is a pH sensitive polymer, a thermal sensitive polymer, a polymer sensitive to concentration change, or is a material sensitive to some other environmental change, general properties such as size, pH sensitivity, thermal sensitivity, etc., can be controlled to some degree by the composition or ratio of the various units on the polymer chain. Further, in the above examples, it should be noted that other comonomers can be added to change the size and the pH, thermal, or other sensitivity of the bridging component. Crosslinking agents can also be used to modulate the sensitivity and other properties of the materials.

In addition to the general methods described above, there are several other methods that can be used to form the bridging layer and the polymer encapsulation layer around a pigment particle. In a first embodiment, the encapsulating latex polymer can be formed in-situ around one or more pigment particles using an emulsion polymerization process. In this process, the pigment can be deaggregated and dispersed in water using standard shear processes, such as microfluidization, sonification, or milling, in the presence of surfactant, dispersing polymer or other dispersing moiety. The dispersed pigment particles can then be mixed with the bridging component, e.g., passivation polymer, such that the bridging component is partially or fully dissolved in solution and forms a homogeneous mixture with the pigment. The condition of the mixture is subsequently changed, for example by temperature or pH change or by dilution, such that the bridging component becomes hydrophobic and consequently is drawn to adsorb onto the pigment surface. Careful selection of pigment dispersant, ratios of pigment to bridging component, etc., can minimize the formation of pure bridging component polymer particles, as it is more desirable that the bridging component be formed primarily on the surface of the pigment particle.

Upon formation of the pigment particle with a bridging layer deposited thereon, a water-soluble initiator suitable for emulsion polymerization can then be introduced into the resultant solution bridging layer-deposited pigment particles with continuous stirring. An aqueous emulsion of latex forming monomers can be prepared and drop-wise introduced into the solution to "seed" onto and bridging layer of the pigment particles using emulsion polymerization synthesis. The thickness of the polymer or latex capsule can be any suitable thickness, but is typically greater than 50 nm to allow adequate film formation to occur on a media substrate upon printing. Typically, the selected pigment core can be sized below 150 nm, but is preferably below 100 nm in diameter, and the latex encapsulated particle diameter can be from about 200 to 300 nm, though diameters outside of this range may be appropriate as well for certain applications.

When applying the bridging layer to the surface of the pigment core, in one embodiment, the concentration range for the bridging component can be from 0.1 to 10 parts (preferably from 1 to 5 parts and most preferably from 2 to 3 parts) for every 10 parts of pigment by weight. In some embodiments, these ratios are helpful in striking a balance between generating enough of a bridging layer to be useful for subsequent polymer encapsulation or pigment passivation, and having too much bridging component in solution such that individual bridging component particles form when the environment is changed. In other words, it is beneficial to have an appropriate amount of bridging component (compared to pigment particles) present such that a desirable amount of the bridging component becomes adsorbed on the pigment particles, and not so much that particles can be formed by collecting in solution to form their own particles.

In still further detail with respect to the various approaches of applying the bridging layer to a pigment particulate, in one embodiment, the bridging component can be selected from the family of polyalkylacrylamides, other thermal sensitive polymers, pH sensitive polymers, concentration sensitive polymers or the like. In the specific case of polyalkylacrylamides, it is believed that the conformation of the adjoining alkyl group changes with temperature to inhibit the natural hydrogen bonding capability of the amide group, thus making the polymer hydrophobic. Polyisopropylacrylamide has been found to be a particularly good bridging component for use, as mentioned above. In this embodiment, at room temperature, the polyisopropylacrylamide is very water soluble at room temperature and becomes very water insoluble at above 32° C. Once desolubilized, it is deposited onto the surface of the pigment core, and forms an excellent seed layer for conventional vinyl monomers, such as acrylates, methacrylates, and styrenes. This being stated, it is realized that the bridging component can be composed of more than one monomer and/or include additional functional monomers without departing from the bi-stable solubility function of this invention. Such other functions may include, for example, photostabilizers and brighteners.

In an alternative approach, a polymer or latex encapsulating polymer can be independently fabricated and subsequently bonded to the bridging layer of a pigment particle. This can be done by applying the pH, thermal, or dilution sensitive bridging layer described above to a pigment particle and combining the polymer or latex with the pigment particles under the action of solvents, milling, heat, or any combination of these. In one example, the polymer capsule material, e.g., latex particulates, solvent, and pigment can ball milled with zirconium balls for 24 hours. The solvent softens the latex such that milling allows the latex to adhere to the bridging layer surface. In general, this approach does not lead to fully or uniformly encapsulated pigment, but these pigments can still be functional for use in thermal ink-jet architecture, as well as for other applications. This being stated, when adequately adhered to the bridging layer surface, the latex particle serves the same purpose as the in-situ processed particle described above.

Other non-limiting approaches of applying bridging layers include forming a bridging layer including bridging component that reacts out surface groups and places a fast reacting monomer layer on the surface; forming a bridging layer from a bridging component that includes slow reacting monomers that are inhibited by the retarding pigment surface groups; forming a bridging layer by melting a polymer to a liquid state to form an emulsion, high shear coating the melted polymer onto the pigment core, and then cooling to a solid; and forming a bridging layer is by dissolving a polymer in a liquid to form an emulsion, high shear coating the emulsion onto the pigment core, and then solidifying the emulsion by solvent extraction or dilution.

Though certain amount of detail is described with respect to the bridging layer above, it is noted that in accordance with embodiments of the present invention, the use of such a layer is optional, but often preferred.

It is also noted that once the pigments are coated with the polymer and monomer mix (with or without an intermediate bridging layer, the coated pigments can be contacted with commonly-used free-radical initiators. Such initiators include, but are not limited to, potassium persulfate, sodium persulfate, ammonium persulfate, hydrogen peroxide, 2,2'-azobis(2-methyl propinamideine)dihydrochloride, 4,4'-azobis(4-cyanovaleric acid) and salts thereof, 1,1'-aobis(N,N'-dimethylformamide), and mixtures thereof. Alternatively, the polymer and monomer mix may include therein a monomer soluble initiator, such as azobis(isobutyronitrile), that may be thermally activated following encapsulation of the pigment.

The teachings of the present invention also include incorporation of the polymer-encapsulated pigments in ink and coating formulations and their use in printing and coating. This being stated, while the emphasis herein is toward application in thermal ink-jet printing, it is recognized that the encapsulation chemistry and process taught in the present invention is equally applicable to other printing and coating technologies wherein pigmented colorants or other particulates are applied or otherwise imaged onto to a substrate. Discussion of thermal ink-jet technology is provided because it is known to have more stringent requirements for effective jetting. Thus, the teachings of this invention are generally applicable to any particulate application wherein a polymeric encapsulation of the pigment is desired. The fundamental teachings are, therefore, not bound by the particular composition of the monomer mix, the properties of the capsule, particle definition, dispersion medium or application.

With these parameters in place, a discussion of dispersion fluids, e.g., inks, etc., is useful to exemplify how these polymer-encapsulated pigments can be implemented for use in accordance with an embodiment of the present invention. Typically, inks include a pigment dispersed in a liquid vehicle. Typical liquid vehicle formulation that can be used with the latexes described herein can include water, and optionally, one or more co-solvents present in total at from 0 wt % to 30 wt %, depending on the jetting architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the liquid vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

In accordance with embodiments of the present invention, the polymer-encapsulated pigments of the present invention can be present in a pigment dispersion at from 1 wt % to 30 wt %. If the pigment dispersion is an ink-jet ink, the polymer-encapsulated pigments of the present invention can be present in a ink-jet ink at from 1 wt % to 10 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Polystyrene

Styrene monomer (50 g) was polymerized in toluene (50 ml) containing azobis(isobutyronitrile) initiator (0.4 g) and isooctylthioglycolate (0.2 g) under nitrogen atmosphere at 85° C. for 18 hours. The polystyrene was precipitated in hexane (700 ml) and then dried.

Example 2

Preparation of Poly(styrene-co-hexyl methacrylate-co-methacrylic acid)

Styrene (10 g), hexyl methacrylate (37 g), and methacrylic acid (3 g) monomers were mixed in toluene (50 ml) containing azobis(isobutyronitrile) initiator (0.4 g) and isooctylthioglycolate (0.2 g) and heated for 2 hours at 90° C. The produced copolymer was cooled and isolated by solvent removal.

Example 3

Pigment Dispersion

Degussa Printex 25 carbon black pigment (150 g) was mixed with Lutensol AT 150 surfactant (15 g) in water (1635 ml), stirred for 12 hours, and then sonicated for 45 min at 90% amplitude using an ultrasonicator.

Example 4

Pigment Passivation

A monomer mix was produced by dissolving the polystyrene polymer (2.37 g) of Example 1 in a blend of styrene (6.96 g) and divinylbenzene (0.14 g) monomer. The solution was mixed with Lutensol AT 150 surfactant (0.08 g), azobis (isobutyronitrile) initiator (0.12 g) and 1-hexadecanol hydrophobe (0.08 g) and stirred well to obtain a clear solution. The resultant solution was emulsified with water (10 ml) then added to the pigment dispersion (378.7 g) of Example 3 and stirred well. The resultant mixture was microfluidized in three passes through a Microfluidics Model 110Y microfluidizer having an 87 μm dispersion chamber and running at 70 psi line air pressure. The microfluidized dispersion was transferred to a flask, heated, and stirred for 18 hours at 80° C. to complete the polymerization. The reacted mixture was cooled and filtered to obtain pigment particles having a thin crosslinked polystyrene passivation layer.

Example 5

Passivated Pigment Encapsulation

A monomer mix was prepared by dissolving the copolymer (0.66 g) of Example 2 in a blend of styrene (0.40 g), hexyl methacrylate (1.42 g), 3-vinylbenzoic acid (0.16 g), and ethyleneglycol dimethacrylate (0.02 g). Lutensol AT 150 surfactant (0.06 g), azobis(isobutyronitrile) initiator (0.09 g), and 1-hexadecanol hydrophobe (0.06 g) was added to the monomer mix and stirred well to obtain a clear solution. The resultant 25% polymer containing monomer mix had a measured viscosity of about 25 cps. The solution was emulsified with water (8 ml), then combined and stirred with the passivated pigment dispersion (50 g) of Example 4. The resultant mixture was microfluidized in three passes through a Microfluidics Model 110Y microfluidizer having an 87 μm dispersion chamber and running at 70 psi line air pressure. The microfluidized dispersion was transferred to a flask, heated and stirred for 18 hours at 70° C. to complete the polymerization. The reacted mixture was cooled and filtered to obtain polymer encapsulated pigment particles averaging 10 parts pigment, 3 parts passivation polymer, and 7 parts encapsulation polymer by weight. TEM images of the produced particles showed an average pigment size of about 235 nm and average capsule thickness of about 65 nm.

Example 6

Non-Passivated Pigment Encapsulation

A monomer mix was prepared by dissolving the copolymer (1.78 g) of Example 2 in a blend of styrene (0.63 g), hexyl methacrylate (2.24 g), 3-vinylbenzoic acid (0.25 g), and ethyleneglycol dimethacrylate (0.03 g). Lutensol AT 150 surfactant (0.15 g), azobis(isobutyronitrile) initiator (0.15 g) and 1-hexadecanol hydrophobe (0.15 g) were added to the monomer mix and stirred well to obtain a clear solution. The solution was emulsified with water (8 ml), then combined and stirred with the non-passivated pigment dispersion (60 g) of Example 3. The resultant mixture was microfluidized in three passes through a Microfluidics Model 110Y microfluidizer having an 87 μm dispersion chamber and running at 70 psi line air pressure. The microfluidized dispersion was transferred to a flask, heated and stirred for 18 hours at 70° C. to complete polymerization. The reacted mixture was cooled and filtered to obtain polymer encapsulated pigment particles having 10 parts pigment and 10 parts encapsulation polymer by weight.

Example 7

Pigment Encapsulation from Pure Monomer Emulsion (Prior Art Approach)

A monomer mix was prepared from styrene (0.40 g), hexyl methacrylate (1.42 g), 3-vinylbenzoic acid (0.16 g), and ethyleneglycol dimethacrylate (0.02 g). Lutensol AT 150 surfactant (0.06 g), azobis(isobutyronitrile) initiator (0.09 g), and 1-hexadecanol hydrophobe (0.06 g) was added to the monomer mix and stirred well to obtain a clear solution. The solution was emulsified with water (8 ml), then combined and stirred with the pigment dispersion (24 g) of Example 3. The resultant mixture was microfluidized in three passes through a Microfluidics Model 110Y microfluidizer having an 87 μm dispersion chamber and running at 70 psi line air pressure. The microfluidized dispersion was transferred to a flask, heated and stirred for 18 hours at 70° C. to complete the polymerization. The reacted mixture was cooled and filtered to obtain polymer encapsulated pigment particles averaging 10 parts pigment, and 10 parts encapsulation polymer by weight. TEM images of the produced particles showed an average capsule thickness of about 15 nm.

Example 8

Transmission Electron Microscope Analysis

Dilute solution TEM screen samples of the encapsulated pigment developed in Examples 5-7 were prepared and analyzed through transmission electron microscopy. The TEM images of Example 7 showed encapsulated pigment particles having an average polymer capsule thickness of approximately 15 nm. The image showed the presence of many pure polymer latex particles, each having an average diameter of about 30 nm. The TEM images of Examples 5 and 6 showed encapsulated pigment particles having an average capsule thickness of approximately 60 nm with no visible pure latex particles formed. The presence of polymer in the encapsulating monomer mix provided significantly thicker capsules while retarding, if not eliminating, shear stripping of the monomer mix from the pigment surface at the given thickness and consequent formation of separate pure polymer latex particles.

Example 9

Film-forming Analysis

Samples of each of the Example 5-7 encapsulated pigment dispersions were placed in separate tins and allowed to room temperature dry to a solid. The tins were subsequently filled with water soaking each of the solids. A clean, unused Q-tip cotton swab was then vigorously rubbed over the surface of each solid. The encapsulated pigment of Example 7 easily redispersed within the water and blackened the Q-tip. The encapsulated pigment solid of Examples 5 and 6 remained undisturbed by the rubbing, showing no redispersion or Q-tip coloration. The encapsulated pigments of the present invention (as exemplified in Examples 5 and 6) formed durable films where the Example 7 encapsulated pigment did not. These tests demonstrate the advantage of the present invention in enabling thick polymer capsules. The thin capsules produced in Example 7 by prior art chemistry lacked the compliance necessary to film form and thereby produce a durable film when coated or printed.

Example 10

Print and Durability Analysis

The encapsulated pigment of Examples 5-7 were separately incorporated in a standard HP ink formulation at 2% pigment solids concentration and printed with an HP ink-jet test bed printer and pen on HP Premium Paper. Each of the three inks printed equally well. Following a 10 minute ink dry period, the text of each of the three prints was highlighted using two consecutive swaths of a yellow highlighter pen. Ink incorporating the Example 7 encapsulated pigment readily and visibly smeared within the highlighter swath with an optical density transfer approximately equal to conventional black pigment ink-jet inks. By contrast, neither of the inks containing Example 5 and 6 encapsulated pigments showed any visible colorant smear. These results are consistent with the film-forming experiment and analysis of Example 9.

What is claimed is:

1. A polymer-encapsulated pigment, comprising:
   a pigment core;
   a polymer shell which includes a first portion of polymer generated at the surface of the pigment core and a second portion of polymer generated prior to incorporation into the polymer shell, said polymer shell being a copolymer including at least one acidic monomer and at least one non-acidic monomer, wherein the at least one acidic monomer is copolymerized substantially throughout the polymer shell but is more concentrated at an outer surface of the polymer shell than within the polymer shell, and wherein the polymer shell itself is not a core-shell polymer.

2. The polymer-encapsulated pigment of claim 1, wherein the polymer shell has an average thickness from 30 nm to 100 nm.

3. The polymer-encapsulated pigment of claim 1, wherein the pigment core is a pigment colorant, and the polymer-encapsulated pigment is suitable for thermal ink-jet applications.

4. The polymer-encapsulated pigment of claim 1, further comprising a bridging layer positioned between the pigment core and the polymer shell.

5. The polymer-encapsulated pigment of claim 1, having a surface dielectric constant from 2.0 to 3.0 at room temperature.

6. The polymer-encapsulated pigment of claim 1, having a surface dielectric constant from 2.0 to 2.8 at room temperature.

7. The polymer-encapsulated pigment of claim 1, wherein the polymer shell includes a crossliniking agent present at from 0.5 wt % to 5 wt %.

8. The polymer-encapsulated pigment of claim 1, wherein the polymer shell has a glass transition temperature from 0° C. to 50° C.

9. The polymer-encapsulated pigment of claim 1, wherein the polymer-encapsulated pigment is from 50 nm to 400 nm in diameter.

10. The polymer-encapsulated pigment of claim 9, wherein the polymer shell has an average thickness from 30 nm to 100 nm.

11. The polymer-encapsulated pigment of claim 1, wherein the at least one acidic monomer is selected from the group of acrylic acid, methacrylic acid, vinyl benzoic acid, and methacryloyloxyethylsuccinate.

12. The polymer-encapsulated pigment of claim 1, wherein the at least one non-acidic monomer is selected from the group of styrene, butyl acrylate, methyl acrylate, hexyl acrylate, benzyl acrylate, 2-ethyihexyl acrylate, butyl methacrylate, 2-ethyihexyl methacrylate, hexyl methacrylate, hydroxyethyl methacrylate, octyl methacrylate, cyclohexyl methacrylate, derivatives and combinations thereof.

13. The polymer-encapsulated pigment of claim 1, wherein the polymer shell includes at least 10% more acidic monomer by weight than is present within the polymer shell.

14. An ink-jet ink formulated with the polymer-encapsulated pigment of claim 1 dispersed therein.

15. A coating composition formulated with the polymer-encapsulated pigment of claim 1 dispersed therein.

* * * * *

UNITED STATES PATENT AND TRADEMARK OFFICE
CERTIFICATE OF CORRECTION

PATENT NO. : 7,544,418 B2
APPLICATION NO. : 11/496892
DATED : June 9, 2009
INVENTOR(S) : Kent D. Vincent et al.

It is certified that error appears in the above-identified patent and that said Letters Patent is hereby corrected as shown below:

In column 17, line 15, in Claim 7, delete "crossliniking" and insert -- crosslinking --, therefor.

In column 18, line 11, in Claim 12, delete "2-ethyihexyl" and insert -- 2-ethylhexyl --, therefor.

In column 18, line 12, in Claim 12, delete "2-ethyihexyl" and insert -- 2-ethylhexyl --, therefor.

Signed and Sealed this

Sixth Day of April, 2010

David J. Kappos
*Director of the United States Patent and Trademark Office*